(12) United States Patent
Kozlowski

(10) Patent No.: US 12,505,515 B2
(45) Date of Patent: Dec. 23, 2025

(54) USING INTRINSIC FUNCTIONS FOR SHADOW DENOISING IN RAY TRACING APPLICATIONS

(71) Applicant: NVIDIA Corporation, Santa Clara, CA (US)

(72) Inventor: Pawel Kozlowski, Truckee, CA (US)

(73) Assignee: NVIDIA Corporation, Santa Clara, CA (US)

(*) Notice: Subject to any disclaimer, the term of this patent is extended or adjusted under 35 U.S.C. 154(b) by 223 days.

(21) Appl. No.: 18/339,146

(22) Filed: Jun. 21, 2023

(65) Prior Publication Data

US 2023/0351555 A1 Nov. 2, 2023

Related U.S. Application Data

(63) Continuation of application No. 17/148,888, filed on Jan. 14, 2021, now Pat. No. 11,727,535.

(51) Int. Cl.
*G06T 5/00* (2024.01)
*G06T 5/20* (2006.01)
(Continued)

(52) U.S. Cl.
CPC .............. *G06T 5/70* (2024.01); *G06T 5/20* (2013.01); *G06T 15/005* (2013.01); *G06T 15/06* (2013.01); *G06T 15/80* (2013.01)

(58) Field of Classification Search
None
See application file for complete search history.

(56) References Cited

U.S. PATENT DOCUMENTS 8,223,148 B1 * 7/2012 Carr ................. G06T 15/06
345/426
RE48,083 E 7/2020 Sen et al.
(Continued)

FOREIGN PATENT DOCUMENTS

CN 1682234 A 10/2005
CN 111383160 A 7/2020

OTHER PUBLICATIONS

Kozlowski, Pawel; First Office Action for Chinese Patent Application No. 202210033280.0, Filed Jan. 12, 2022, mailed Dec. 5, 2024, 14 pgs.
(Continued)

*Primary Examiner* — Martin Mushambo
(74) *Attorney, Agent, or Firm* — Iron Summit IP LLP

(57) ABSTRACT

In examples, threads of a schedulable unit (e.g., a warp or wavefront) of a parallel processor may be used to sample visibility of pixels with respect to one or more light sources. The threads may receive the results of the sampling performed by other threads in the schedulable unit to compute a value that indicates whether a region corresponds to a penumbra (e.g., using a wave intrinsic function). Each thread may correspond to a respective pixel and the region may correspond to the pixels of the schedulable unit. A frame may be divided into the regions with each region corresponding to a respective schedulable unit. In denoising ray-traced shadow information, the values for the regions may be used to avoid applying a denoising filter to pixels of regions that are outside of a penumbra while applying the denoising filter to pixels of regions that are within a penumbra.

20 Claims, 8 Drawing Sheets

(51) Int. Cl.
  *G06T 5/70*   (2024.01)
  *G06T 15/00*  (2011.01)
  *G06T 15/06*  (2011.01)
  *G06T 15/80*  (2011.01)

(56) References Cited

U.S. PATENT DOCUMENTS

| | | | |
|---|---|---|---|
| 11,727,535 B2 | 8/2023 | Kozlowski | |
| 2004/0054477 A1* | 3/2004 | Bernitsas | G01V 1/20 702/14 |
| 2005/0190194 A1* | 9/2005 | Kraemer | G06T 15/04 345/582 |
| 2007/0279412 A1* | 12/2007 | Davidson | H04N 13/261 345/419 |
| 2008/0175507 A1* | 7/2008 | Lookingbill | G06V 20/63 382/255 |
| 2009/0034870 A1 | 2/2009 | Keshet et al. | |
| 2011/0150338 A1* | 6/2011 | Smith | G06V 10/56 382/190 |
| 2013/0328895 A1* | 12/2013 | Sellers | G06T 1/20 345/522 |
| 2014/0029849 A1* | 1/2014 | Sen | G06T 15/503 382/167 |
| 2015/0042651 A1* | 2/2015 | Dwyer | G06T 15/50 345/426 |
| 2015/0262407 A1* | 9/2015 | Fursund | G06T 15/80 345/426 |
| 2015/0262409 A1* | 9/2015 | Morgan | G06T 15/60 345/421 |
| 2015/0294511 A1* | 10/2015 | Nishioka | H04N 23/73 345/420 |
| 2016/0260245 A1* | 9/2016 | DeCell | G06T 15/06 |
| 2016/0350960 A1 | 12/2016 | Yi et al. | |
| 2018/0268604 A1 | 9/2018 | Story | |
| 2019/0287291 A1* | 9/2019 | Liu | G06T 15/506 |
| 2020/0058105 A1* | 2/2020 | Liu | G06T 15/50 |
| 2020/0074717 A1* | 3/2020 | Story | G06T 15/06 |
| 2020/0302675 A1* | 9/2020 | Story | G06T 15/06 |
| 2021/0027520 A1* | 1/2021 | Story | G06T 15/005 |
| 2021/0192830 A1* | 6/2021 | Story | G06F 9/3877 |
| 2021/0326694 A1* | 10/2021 | Wang | G06N 3/084 |
| 2021/0382717 A1 | 12/2021 | Jiang et al. | |
| 2021/0382720 A1* | 12/2021 | Ganapathy | G06F 9/3009 |
| 2022/0005257 A1* | 1/2022 | Story | G06T 15/06 |
| 2022/0036641 A1* | 2/2022 | Vorba | G06T 15/06 |
| 2022/0036652 A1 | 2/2022 | Rabbani et al. | |
| 2022/0319098 A1* | 10/2022 | Story | G06F 9/3877 |
| 2024/0070965 A1* | 2/2024 | Story | G06T 15/405 |

OTHER PUBLICATIONS

Kozlowski, Pawel; Non-Final Office Action for U.S. Appl. No. 17/148,888, filed Jan. 14, 2021, mailed Jul. 27, 2022, 15 pgs.

Kozlowski, Pawel; Final Office Action for U.S. Appl. No. 17/148,888, filed Jan. 14, 2021, mailed Nov. 21, 2022, 14 pgs.

Kozlowski, Pawel; Applicant-Initiated Interview Summary for U.S. Appl. No. 17/148,888, filed Jan. 14, 2021, mailed Feb. 23, 2023, 2 pgs.

Kozlowski, Pawel; Notice of Allowance for U.S. Appl. No. 17/148,888, filed Jan. 14, 2021, mailed Mar. 21, 2023, 8 pgs.

Lively, et al.; 2017. Wave Programming in D2D12 and Vulkan. Game Developers Conference. 28 pgs. Retrieved Jan. 14, 2021 from URL:<http://32ipi02815q82yhj72224m8j.wpengine.netdna-cdn.com/wp-content/uploads/2017/07/GDC2017-Wave-Programming-D2D12-Vulkan.pdf>.

Kozlowski, Pawel; Non-Final Office Action for U.S. Appl. No. 17/148,888, filed Jan. 14, 2021, dated Dec. 17, 2021, 18 pgs.

Kozlowski, Pawel; Final Office Action for U.S. Appl. No. 17/148,888, filed Jan. 14, 2021, mailed Apr. 5, 2022, 15 pgs.

Kozlowski, Pawel; Notice of Registration for Chinese Patent Application No. 202210033280.0, filed Jan. 12, 2022, mailed May 13, 2025, 5 pgs.

* cited by examiner

USING INTRINSIC FUNCTIONS FOR SHADOW DENOISING IN RAY TRACING APPLICATIONS

CROSS-REFERENCE TO RELATED APPLICATIONS

This application is a continuation of U.S. patent application Ser. No. 17/148,888, filed Jan. 14, 2021, which is incorporated herein by reference in its entirety.

BACKGROUND

Ray tracing is an approach used to render images by tracing a path of light in a virtual environment and simulating the effects of the light's interactions with virtual objects. Ray tracing techniques may be used to simulate a variety of optical effects—such as shadows, reflections and refractions, scattering phenomenon, and dispersion phenomenon (such as chromatic aberration). When rendering soft shadows using ray tracing, conventional approaches to shadow tracing may cast any number of shadow rays from a location in a virtual environment to sample lighting conditions for a pixel with respect to a light source. The ray-traced samples may be combined and applied to the pixel. In a penumbra (a region of a shadow where light is partially occluded) some of the shadow rays may be visible to the light source and others may be occluded. A large number of shadow rays may be needed in order for the combined lighting conditions to converge to an accurate result. To conserve computing resources and reduce rendering times, the shadow rays may be sparsely sampled, resulting in noisy shadow data. The noisy shadow data may be filtered using denoising techniques to reduce noise and produce a final render that more closely approximates a render of a fully-sampled scene.

Computing resources used for denoising shadow data may be reduced by focusing denoising on pixels that are within a penumbra. For example, fully lit or fully shadowed pixels that are outside of the penumbra need not be denoised, as corresponding ray-traced samples reflect the shadowing of those pixels. A penumbra mask may be generated and used to indicate which pixels are within a penumbra during denoising. Generating the penumbra mask typically involves a post-processing pass that is performed on the shadow data and may be computationally expensive due to accessing global memory.

SUMMARY

Embodiments of the present disclosure relate to using wave intrinsic functions to detect penumbra regions for shadow denoising. In particular, the present disclosure relates, in part, to leveraging threads of schedulable units of parallel processors that were used to sample visibility in ray-tracing in order to identify penumbra regions for denoising ray-traced shadows.

In contrast to conventional approaches, disclosed approaches may be used to determine which pixels of a frame are within a penumbra while avoiding a post-processing pass. In accordance with aspects of the disclosure, threads of a schedulable unit (e.g., a warp or wavefront) of a parallel processor may be used to sample visibility of pixels with respect to one or more light sources. At least one of the threads may receive the results of the sampling performed by other threads in the schedulable unit (e.g., each other thread) to compute a value that indicates whether a region corresponds to a penumbra (e.g., using a wave intrinsic function of the parallel processor). In at least one embodiment, each thread may correspond to a respective pixel and the region may correspond to the pixels of the schedulable unit. Further, a frame may be divided into regions of pixels with each region corresponding to a respective schedulable unit. In applying a denoising pass to ray-traced shadow information, the values for the regions may be used to avoid applying a denoising filter to pixels of regions that are outside of a penumbra while applying the denoising filter to pixels of regions that are within a penumbra. For example, the values may be used to generate a penumbra mask and the penumbra mask may be used to denoise a shadow mask.

The disclosure further provides approaches for determining parameters of denoising filters. In accordance with aspects of the disclosure, threads of a schedulable unit may be used to sample one or more aspects of a scene (e.g., visibility, global illuminations, ambient occlusions, etc.). At least one of the threads may receive the results of the sampling by other threads in the schedulable unit (e.g., each other thread) to compute a value(s) that indicates one or more properties of a region of the scene (e.g., using a wave intrinsic function of the parallel processor). In applying a denoising pass to render data, the values for the regions may be used to determine one or more parameters of denoising filters applied to the render data. For example, the values may be used to determine a filter radius and/or a range of values to include in filtering.

BRIEF DESCRIPTION OF THE DRAWINGS

The present systems and methods for using wave intrinsic functions to detect penumbra regions for shadow denoising are described in detail below with reference to the attached drawing figures, wherein.

DETAILED DESCRIPTION

Figure 1:
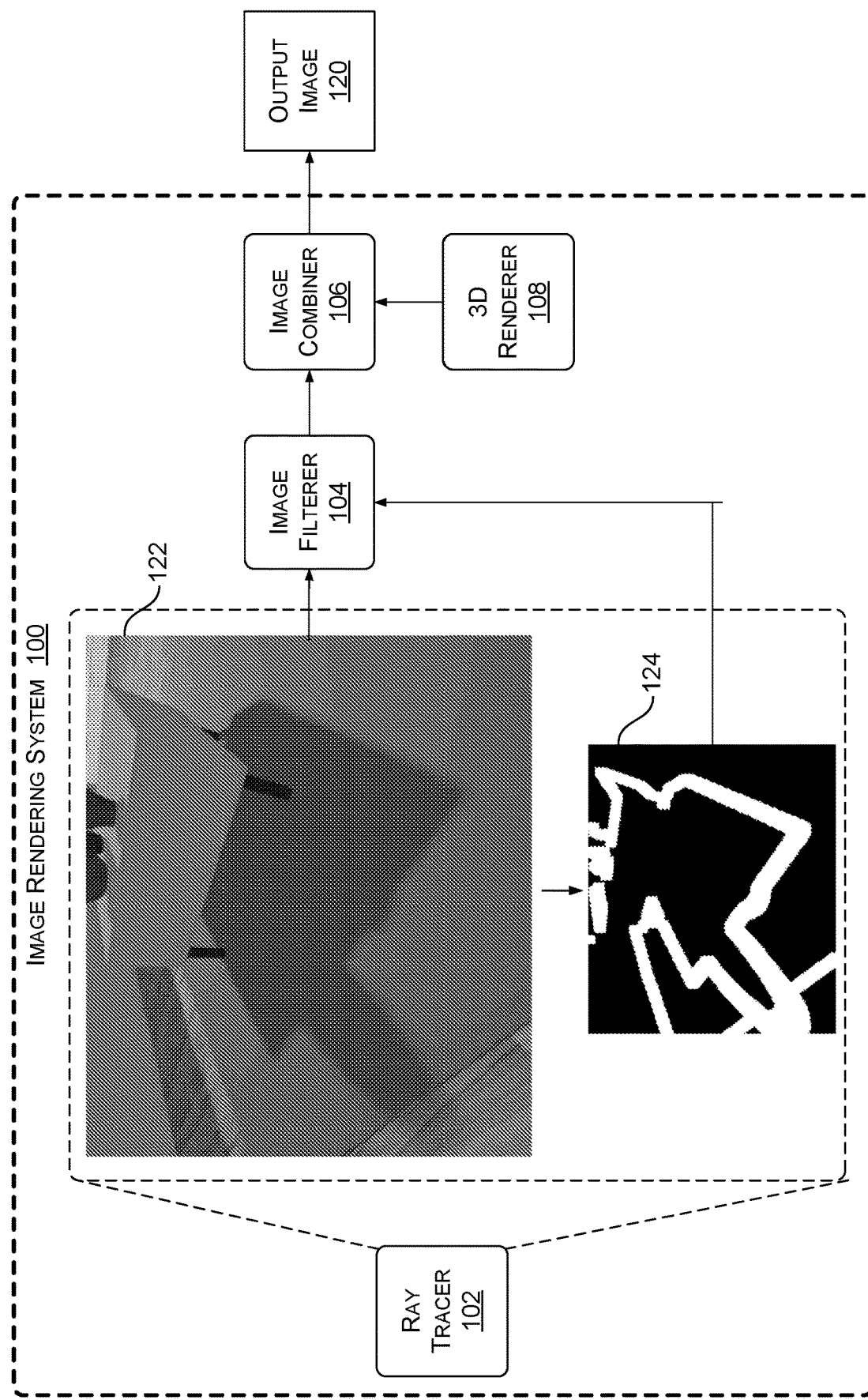
FIG. 1 is a data flow diagram illustrating an example process for generating an output image using an image rendering system, in accordance with some embodiments of the present disclosure.

The present disclosure relates to using wave intrinsic functions to detect penumbra regions for shadow denoising. In particular, the disclosure provides, in part, for leveraging threads of schedulable units of parallel processors that were used to sample visibility in ray-tracing in order to identify penumbra regions for denoising ray-traced shadows.

Disclosed approaches may be used to determine statistical values used to inform denoising of render data without requiring a dedicated post-processing pass. For example, the statistical values may be used to determine which pixels of a frame are within a penumbra during denoising of render data and/or to guide filtering of the render data. The render data may include spatial and/or temporal ray-traced samples.

In accordance with aspects of the disclosure, threads of a schedulable unit (e.g., a warp or wavefront) of a parallel processor may be used to sample one or more aspects of a virtual environment with respect to pixels (e.g., by executing shader code). In embodiments that determine which pixels are within a penumbra, the conditions may include visibility of the pixels with respect to one or more light sources.

The threads may be arranged into groups of threads, where a group of threads may refer to each thread of a schedule unit, or a subset of threads of a schedulable unit. At least one of the threads from a group may receive the results of the sampling performed by other threads within the group. The thread(s) may compute a statistical value regarding the ray-traced samples. For example, for visibility, each thread may compute a value that indicates whether a region of a frame corresponds to a penumbra. In at least one embodiment, a wave intrinsic function of the parallel processor may be used to retrieve values that correspond to the ray-traced samples from other threads. For example, a wave active sum function may return a sum (a statistical value) of the values to a thread. The statistical values computed by the thread may be used to inform filtering of render data. For example, a statistical value may be used as a mask value or may be used by the thread to compute the mask value. Mask values may be stored in a mask, which may be accessed during denoising. In at least one embodiment, the mask may be a penumbra mask that indicates which pixels correspond to a penumbra.

In at least one embodiment, each thread may correspond to a respective pixel and the region of the frame for which a statistical value is computed may correspond to the pixels of the group of threads. Further, a frame may be divided into regions of pixels with each region corresponding to a respective group of threads and/or schedulable unit. Using disclosed approaches, a post-processing pass may not be needed to determine statistical values used to inform denoising of render data, thereby reducing the processing time for denoising render data. For example, the threads of schedulable units may determine samples of the virtual environment and the statistical values from the samples (e.g., as part of executing a ray generation shader). The statistical values may be computed from registers of the threads, which may have significantly lower access times than memory used for post-processing.

In at least one embodiment, in applying a denoising pass to render data (e.g., the ray-traced samples), the statistical values for the regions may be used to avoid applying a denoising filter to one or more pixels of regions. For example, where a mask value of the penumbra mask indicates a region is outside of a penumbra, a denoising filter may not be applied to pixels within the region. The disclosure further provides approaches for determining one or more parameters of denoising filters. For example, in addition to or instead of using the statistical values to determine which pixels to skip when applying a denoising filter, statistical values may be used to determine one or more parameters of the denoising filter for a pixel. Examples of the parameters include parameters that define a filter radius, filter weights, and/or a range of values to include in filtering.

With reference to FIG. 1, FIG. 1 is a data flow diagram illustrating an example process 140 for generating an output image 120 using an image rendering system 100, in accordance with some embodiments of the present disclosure. This and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination, arrangement, or location. Various functions described herein as being performed by entities may be carried out by hardware, firmware, and/or software. For instance, various functions may be carried out by a processor executing instructions stored in memory.

Figure 8:
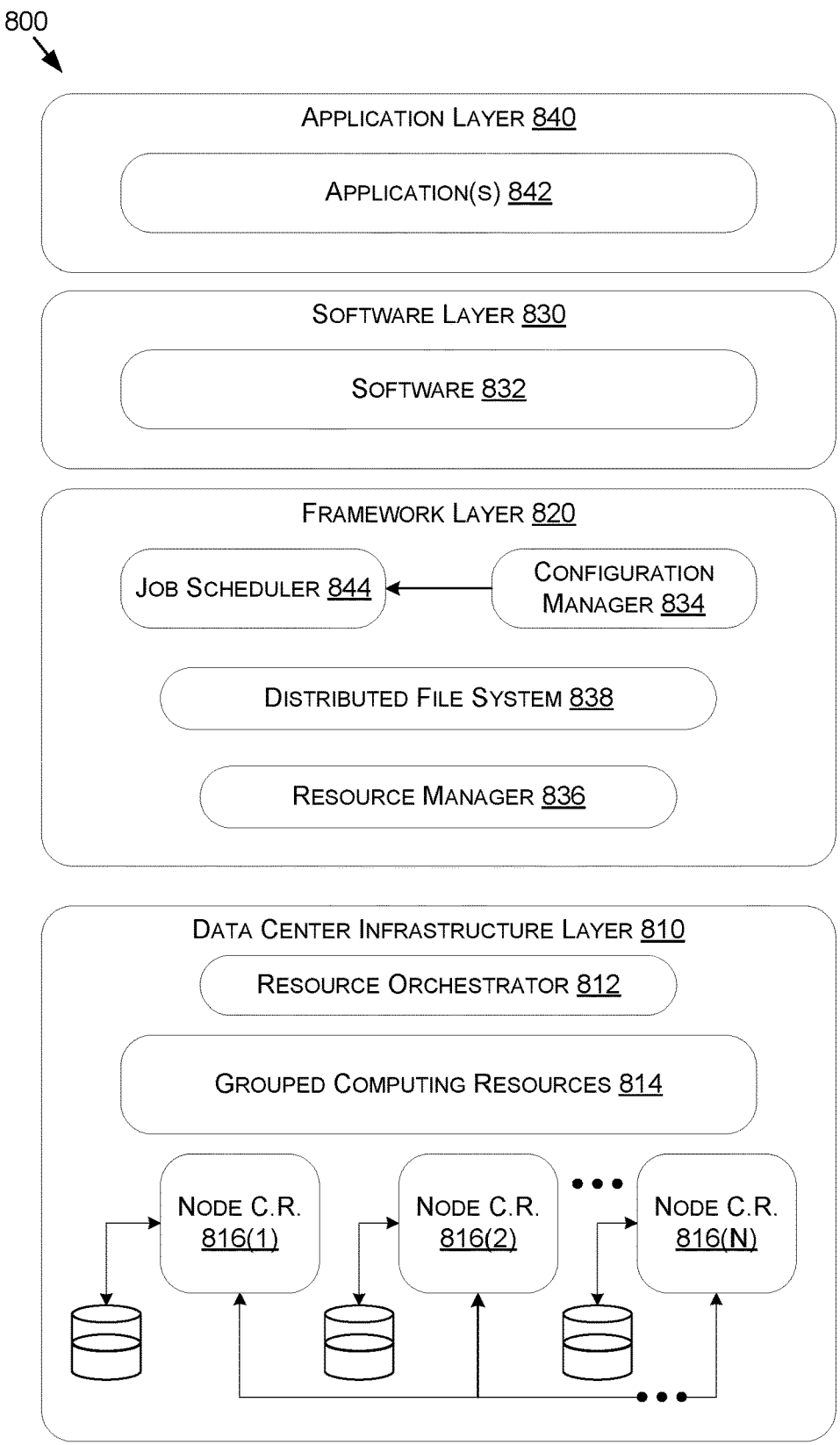
FIG. 8 is a block diagram of an example data center suitable for use in implementing some embodiments of the present disclosure.

In at least one embodiment, the image rendering system 100 may be implemented, at least in part, in the data center 800 of FIG. 8. As various examples, the image rendering system 100 may comprise or be included in one or more of a system for performing simulation operations, a system for performing simulation operations to test or validate autonomous machine applications, a system for performing deep learning operations, a system implemented using an edge device, a system incorporating one or more Virtual Machines (VMs), a system implemented at least partially in a data center, or a system implemented at least partially using cloud computing resources.

Figure 3:
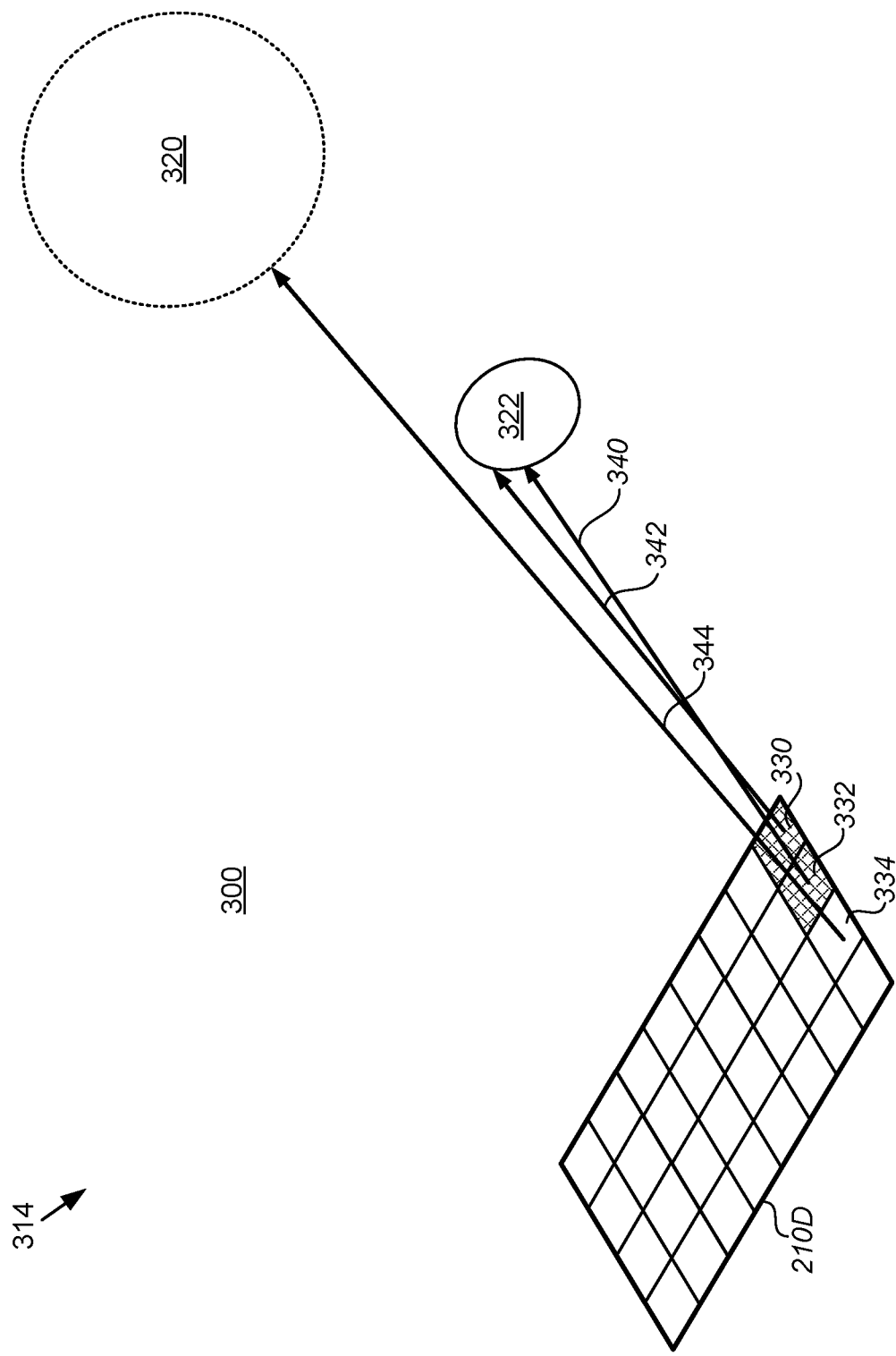
FIG. 3 is a diagram illustrating an example of capturing ray-traced samples of a virtual environment, in accordance with some embodiments of the present disclosure.

The image rendering system 100 may be configured to render images of virtual environments, such as a virtual environment 300 of FIG. 3. To render an image of a virtual environment (which may also be referred to as a scene), the image rendering system 100 may employ a ray tracer 102, an image filterer 104, an image combiner 106, and a Three-Dimensional (3D) renderer 108.

The ray tracer 102 may be configured to trace rays through a virtual environment using any of a variety of potential ray tracing techniques in order to generate ray-traced samples of one or more aspects of the virtual environment (e.g., lighting conditions such as visibility) with respect to locations in the virtual environment. The ray-traced samples may be determined using schedulable units of one or more parallel processors, such as the GPU(s) 708 of FIG. 7. Further the ray-traced sample may be captured by or otherwise used to generate render data 122 (e.g., by the schedulable units). The ray tracer 102 may also be configured to compute (e.g., by the schedulable units) values from the ray-traced samples, such as statistical values (e.g., sums of visibility values in schedulable units). The values may be determined from the render data 122 using the schedulable units and may indicate whether corresponding locations and/or pixels correspond to a penumbra of a shadow. In embodiments, the values may be captured by or otherwise used to generate mask data 124.

The image filterer 104 may be configured to filter the render data 122 from the ray tracer 102 (or other render data) based at least on the values computed from the ray-traced samples (e.g., using the mask data 124). For example, where a value indicates a location or pixel corresponds to a penumbra (e.g., white pixels in the mask data 124 of FIG. 1), the denoiser may apply a denoising filter to the location or pixel. Where a value indicates a location or pixel corresponds to a fully lit or fully shadowed region (e.g., black pixels in the mask data 124 of FIG. 1), the denoiser may skip applying a denoising filter to the location or pixel (also referred to as "early out").

In some embodiments, the image combiner 106 may combine data corresponding to the filtered render data 122 (e.g., filtered shadow/visibility data) with data representing a 3D render of the virtual environment (e.g., without ray-traced shadow data) to generate the output image 120. The 3D renderer 108 may be configured to generate the 3D render using any suitable approach, which may or may not include ray tracing. In embodiments, the 3D render may comprise pixel color information for a frame of the virtual environment.

As described herein, the ray tracer 102 may be configured to trace rays through a virtual environment using any of a variety of potential ray tracing techniques in order to generate ray-traced samples of one or more aspects of the virtual environment with respect to locations in the virtual environment. The ray tracer 102 may also be configured to compute values from the ray-traced samples, such as statistical values (e.g., sums of visibility values in schedulable units), which may be leveraged by other components of the rendering pipeline, such as the image filterer 104. In various embodiments, the ray tracer 102 may leverage schedulable units of one or more processors for parallel processing to generate the ray-traced samples and values derived from the ray-traced samples. In doing so, the values (e.g., reflected in the mask data 124) may be derived without requiring a post processing pass. Amongst other potential advantages, the values may be computed more quickly than using conventional approaches, as the data used to compute the values (e.g., the render data 122) may be accessed from registers of threads, as opposed to shared or global memory.

In various embodiments, a schedulable unit may refer to a hardware schedulable group of threads that may be used for parallel processing. A thread may refer to a GPU thread or a CPU thread. In various examples, the threads may be implemented, at least in part, using a Single Instruction, Multiple Thread (SIMT) execution model. A thread may also be referred to as a work item, a basic element of data to be processed, an individual lane, or a sequence of Single Instruction, Multiple Data (SIMD) lane operations.

Examples of schedulable units include warps in relation to NVIDIA terminology (e.g., CUDA-based technology) or wavefronts in relation to AMD terminology (e.g., OpenCL-based technology). For CUDA-based technology a schedulable unit may, by way of example and not limitation, comprise 32 threads. For OpenCL-based technology, a schedulable unit may, by way of example and not limitation, comprise 64 threads. In one or more embodiments, a schedulable unit may refer to a thread of SIMD instructions. In one or more embodiments, a schedulable unit may comprise a collection of operations that execute in lockstep, run the same instructions, and follow the same control-flow path. In some embodiments, individual or groups of lanes or threads of a schedulable unit may be masked off from execution.

In various embodiments, the ray tracer 102 may operate one or more shaders or programs that are executed by one or more schedulable units for parallel processing to generate the ray-traced samples and the values derived from the ray-traced samples. For example, the ray-traced samples may be generated by a same shader as the values derived from the ray-traced samples. The shader may be, for example, a ray generation shader, where code of the ray generation shader may be executed by one or more groups of threads and/or schedulable units (e.g., in parallel).

Figure 2:
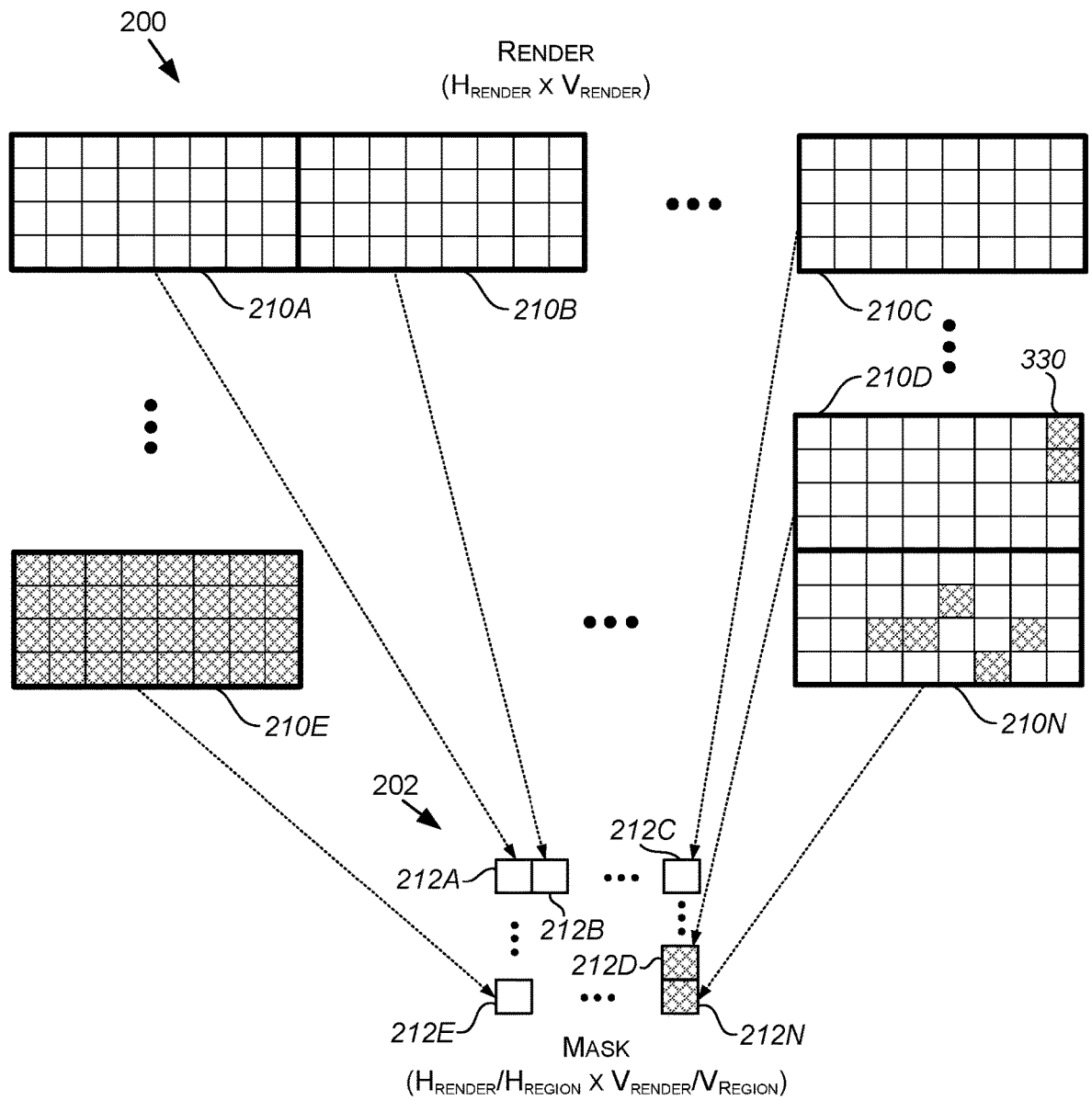
FIG. 2 is a diagram illustrating an example of how values of a render may correspond to values of a mask, in accordance with some embodiments of the present disclosure.

Referring now to FIG. 2, FIG. 2 is a diagram illustrating an example of how values of a render 200 may correspond to values of a mask 202, in accordance with some embodiments of the present disclosure. The render 200 may correspond to the render data 122 of FIG. 1 and the mask 202 may correspond to the mask data 124 of FIG. 1. In at least one embodiment, the ray tracer 102 may divide a render or frame into regions, where each region may correspond to one or more pixels and/or locations of the virtual environment 300. For example, the render 200 may be divided into regions 210A, 210B, 210C, 210D, 210E, through 210N (also referred to herein collectively as "regions 210"). In at least one embodiment, the ray tracer 102 (e.g., shader code executed by threads) may configure the regions 210 so that they are non-overlapping and encompass an entirety of a frame or render. For example, in FIG. 2, each region 210 corresponds to a rectangular region of pixels of the frame.

In the example shown, each region 210 corresponds to a schedulable unit and each thread within a schedulable unit corresponds to a respective pixel or cell of the region 210. In particular, the example shown relates to a warp, where each region 210 may correspond to 32 pixels and threads. Where the render 200 is $H_{render}$ pixels×$V_{render}$ pixels, and each region is $H_{region}$ pixels×$V_{region}$ pixels, there may be $H_{render}/H_{region} \times V_{render}/V_{region}$ regions in the render 200. Each region 210 in FIG. 2 comprises an 8×4 region of pixels that corresponds to the 32 pixels of the schedulable unit. Thus, in the example shown—for a frame that is 1920×1080 pixels—there may be 64,800 of the regions 210. Other examples may relate to wavefronts, and each region 210 may correspond to 64 pixels and threads. The ray tracer 102 may distribute the pixels or cells of a schedulable unit in any suitable fashion. For example, in various embodiments, a schedulable unit may not necessarily be rectangular, may not necessarily be contiguous, may not necessarily be non-overlapping with other schedulable units, and/or each thread may not necessarily correspond to a single pixel.

As described herein, the ray tracer 102 may determine, using threads of a schedulable unit, values that correspond to ray-traced samples. In at least one embodiment, the pixels or cells of a region 210 may store values of the ray-traced samples and/or values derived from the ray-traced samples. For example, each thread may store a value of a ray-traced sample for a pixel or cell that was generated by the thread in a register.

Examples of the ray-traced samples are described with respect to FIG. 3. Referring now to FIG. 3, FIG. 3 is a diagram illustrating an example of capturing ray-traced samples of the virtual environment 300, in accordance with some embodiments of the present disclosure. The image rendering system 100 may be configured to use the ray tracer 102 to render an image using any number of ray tracing passes in order to sample conditions of a virtual environment.

The example of FIG. 3 is described in relation to samples of visibility, and more particularly samples of visibility of the one or more pixels with respect to a light source in the virtual environment 300. In such examples, the render 200 of FIG. 2 may correspond to a shadow mask of a frame.

However, disclosed approaches may be implemented with other types of ray-traced samples, which may include those which form a binary signal (e.g., have a value of 0 or 1) or a non-binary signal. In some embodiments, the ray-traced samples may represent, indicate, or otherwise correspond to ambient occlusions, global illuminations, or other properties of the one or more pixels and/or locations with respect to the virtual environment 300. When sampling different aspects of a virtual environment, ray tracing techniques may be adapted to suit the effect(s) being simulated. Further, in the present example, when a ray interacts with a location in the virtual environment 300 (e.g., at the light source 320 or an occluder 322), no additional ray may be cast from that location. However, for other ray tracing effects or techniques, one or more additional rays may be cast therefrom.

In at least one embodiment, the ray-tracer 102 may cast or trace rays using a ray generation shader(s). Various examples of the rays which may be traced (e.g., using one ray per-pixel) by the ray-tracer 102 through the virtual environment 300 are illustrated in FIG. 3 with respect to a ray tracing pass 314. For example, a ray 340, a ray 342, and a ray 344 are individually labeled amongst the nine rays shown for the ray tracing pass 314. The ray tracer 102 may use the rays to collectively sample one or more aspects of the virtual environment 300 with respect to locations in the virtual environment 300. Examples of thirty-two locations of the region 210D are shown, of which locations 330, 332, and 334 are individually labeled. However, each region 210 may be similarly sampled in the ray tracing pass 314.

In at least one embodiment, each ray is associated with one of the locations (e.g., is cast from the location) and is used to generate a ray-traced sample for the location. For example, the ray 340 is associated with the location 332, the ray 342 is associated with the location 330, and the ray 344 is associated with the location 334. In some embodiments, each location from which the ray tracer 102 casts a ray corresponds to a respective pixel of a region 210, as shown. For example, locations—such as locations 330, 332, and 334—may be determined by transforming a virtual screen of pixels (e.g., from a z-buffer) into world-space. The virtual screen may be representative of a view of a camera in the virtual environment 300 and the locations may, in some embodiments, be referred to as pixels, or world-space pixels (e.g., of the render 200). In other examples, locations may not have such a one-to-one correspondence with pixels. Further, in other examples, the locations may be determined as respective points and/or areas at which respective eye-rays (e.g., cast from a camera through a virtual screen comprising the pixels) interact with the virtual environment 300.

In various embodiments, the accuracy of a sample at a location may be limited, as each ray may only provide partial information for the location. As such, using a limited number of rays to sample the virtual environment 300 may result in the occurrence of noise in images, particularly for certain locations in the virtual environment 300. To illustrate the forgoing, the rays used in the example shown are shadow rays used to sample one or more aspects of lighting conditions at locations with respect to a light source 320 in the virtual environment 300. The image rendering system 100 may use this information, for example, to render shadows in an image based on the lighting conditions at the locations. In some embodiments, rays are cast from locations to sample a random, or pseudo-random, position at the light source 320. The ray tracer 102 may use any suitable approach for ray tracing, such as stochastic ray tracing. Examples of stochastic ray tracing techniques that may be used include those that employ Monte Carlo or quasi-Monte Carlo sampling strategies. In the example shown, the ray tracer 102 (e.g., each thread) casts one ray per location and/or pixel in the ray tracing pass 314 for sampling. In other embodiments a different quantity of rays may be cast per location or pixel, no rays may be cast for certain locations or pixels, and/or different amounts of rays may be cast for different locations or pixels (e.g., by each thread). Where multiple rays are cast for a pixel or location, a value for a pixel or cell in the render 200 may correspond to an aggregate (e.g., average) of values of the ray-traced samples of the pixel or location.

While only the light source 320 is shown, lighting conditions at locations may similarly be sampled with respect to other light sources and/or objects in the virtual environment 300, which may be combined with ray-traced samples derived with respect to the light source 320, or may be used to generate an additional render 200 (and mask 202) that may be filtered by the image filterer 104 and provided to the image combiner 106. For example, lighting conditions for different light sources may be determined and filtered separately (e.g., using the filtering techniques described with respect to FIG. 1), and combined by the image combiner 106 (e.g., as another input to the image combiner 106).

As shown, some of the rays, such as the ray 344, may interact with the light source 320 resulting in ray-traced samples indicating light from the light source 320 may illuminate corresponding locations. In some embodiments, rays that fall into this category may be assigned a visibility value of 1 to indicate they are visible with respect to the light source 320 (indicated by no shading in FIGS. 2 and 3). Other rays, such as ray 340 and ray 342 may interact with an object resulting in ray-traced samples indicating light from the light source 320 is at least partially blocked and/or prevented from reaching the locations. An example of such an object is the occluder 322, which may block the rays from reaching the light source 320. In some embodiments, rays that fall into this category may be assigned a visibility value of 0 to indicate they are not visible with respect to the light source 320 (indicated by shading in FIGS. 2 and 3). As the visibility value may assume one of two potential values, it may correspond to a binary signal.

In at least one embodiment, a thread may determine the visibility for a corresponding location(s) and may store a corresponding value(s) for one or more pixels of the region 210 that correspond to the thread (e.g., in accordance with shader code). For example, each thread may determine and store a visibility value (e.g., 1 or 0) for a location/pixel in a register. In at least one embodiment, each thread may have a dedicated register for storing the value(s). The render data 122 of FIG. 1 may represent the values stored in the registers of the threads.

In the example of FIG. 3, the ray tracer 102 may determine that in the region 210D, the locations 330 and 332 are not visible to the light source 320 and all other locations are visible. The location 330 is an example of a location that may be within a penumbra of a shadow cast by the occluder 322, and the lighting conditions may be more accurately computed by combining the ray-traced samples derived from multiple rays. For example, a ray-traced sample of the location 330 generated using only the ray 342 may indicate that the location 330 is completely blocked from receiving light from the light source 320. However, if a ray-traced sample of the location 330 were generated using another ray, it may indicate that the location 330 is at least partially illuminated by the light source 320, such that the location 330 is within a penumbra.

Limiting the number of rays used to generate samples for locations may therefore cause noise resulting in visual artifacts in data rendered by the image rendering system 100. The image filterer 104 may be used to implement denoising techniques to reduce the noise. In various examples, the denoising techniques may include the image filterer 104 spatially and/or temporally filtering lighting condition data or other render data that corresponds to the ray-traced samples from the ray tracer 102. For example, the image filterer 104 may apply one or more spatial filter passes and/or temporal filter passes to the render data 122 from the ray tracer 102. In accordance with the disclosure, the image filterer 104 may use the mask data 124 or data otherwise corresponding to values generated by the threads from values of ray-traced samples, as inputs to inform the denoising.

Returning to FIG. 2, a thread may store a value(s) generated by the thread from values of ray-traced samples of at least one other thread in a region of the mask 202. The region of the mask 202 may comprise one or more pixels or cells of the mask 202. In the present example, each region of the mask 202 is a single pixel or cell, but in other cases different regions may comprise different numbers of pixels or cells and/or each region may comprise more than one pixel or cell. The mask 202 includes regions 212A, 212B, 212C, 212D, and 212E through 212N (referred to collectively as regions 212). In some examples, each region 210 of the render 200 is mapped to a single region 212 (e.g., by the shader code executed by the threads). Thus, the mask 202 may comprise 64,800 pixels or cells. In other examples, a region 210 may be mapped to multiple regions 212 and/or a region 212 may correspond to multiple regions 210 (e.g., values from multiple regions 210 may be blended or otherwise aggregated by the thread(s) to form values in one or more regions 210).

For example, at least one thread of the schedulable unit corresponding to the region 210A may store a value generated by the thread in the region 212A of the mask 202, where the value is generated from the values of threads in the schedulable unit. Also, a thread of the schedulable unit corresponding to the region 210B may store a value generated by the thread in the schedulable unit in the region 212B of the mask 202, where the value is generated from the values of threads in the schedulable unit. Similarly, the region 210C may correspond to the region 212C, the region 210D may correspond to the region 212D, the region 210E may correspond to the region 212E, and the region 210N may correspond to the region 212N.

As described herein, a thread may compute a value for the mask 202 (which may also be referred to as a mask value) based at least on the ray-traced samples of each thread within a group of threads and/or schedulable unit. Generally, threads of a schedulable unit may only be capable of accessing values of ray-traced samples generated by other threads in the schedulable unit. Thus, each group of threads may be within a same schedulable unit. In the example shown, each schedulable unit comprises a single group of threads and the group of threads includes all of the threads of the schedulable unit. At least one thread (e.g., each thread) may aggregate the ray-traced samples for the schedulable unit and at least one thread (e.g., one of the threads) may store a result in a region(s) of the mask 202. Thus, the mask 202 may have a lower resolution than the frame being rendered, which may reduce processing and storage requirements.

In other examples, a schedulable unit may be divided into multiple groups of threads. Where a schedule unit includes multiple groups of threads, a region 212 of the mask 202 may be provided for each group of threads or the groups may share a region 212. For example, the region 210N of the render 200 may include a group of 16 threads corresponding to a left-hand side 4×4 group of pixels and a group of 16 threads corresponding to a right-hand side 4×4 group of pixels. In this example, the region 212N of the mask 202 may instead comprise two adjacent regions—one for each subgroup of the region 212D. As examples, a same thread(s) of the schedulable unit may compute and store the values for both groups of threads, or different threads may compute and store the mask values for each group of threads. For example, for each group of threads, each thread within in the group may compute a mask value and at least one of those threads may store the value in the mask 202 (e.g., in a buffer). Splitting a schedule unit into multiple groups of threads may be used to increase the resolution of the mask 202.

In at least one embodiment, a thread may receive ray-traced samples and compute a value for the mask 202 using a wave intrinsic function(s). A wave intrinsic function may refer to a built-in function available for use in code executed by one or more threads of a schedulable unit. A wave intrinsic function may allow a thread to access a value from another thread in the schedulable unit. Various wave intrinsic functions may be employed, which may depend upon the format and/or desired information that is to be captured by the value(s) being computed for the mask 202. As an example, a thread may execute a wave active sum function. The wave action sum function may receive a value (e.g., visibility value) of a ray-traced sample from each thread of the schedulable unit (from the registers), compute a sum of those values, and return the computed sum as a result.

In the example shown, the computed value may indicate whether one or more pixels and/or locations of the virtual environment are within a penumbra. For example, the values of the ray-traced samples may be visibility values that are either 0 or 1. For a region 210 of the render 200, the sum of the visibility values may be between 0 and 32. A value of 0 may indicate that locations that correspond to the region are fully shaded. The region 210E is an example of a region that may be indicated as fully shaded. A value of 32 may indicate that locations that correspond to the region 210 is fully lit. The regions 210A, 210B, and 210C are examples of regions that may be indicated as fully lit. A value between 0 and 32 (the total number of threads in the group) may indicate that locations that correspond to the region are in a penumbra. The regions 210D and 210N are examples of regions that may be indicated as in a penumbra. While the examples are provided for whole regions 210, they may similarly apply to sub groups or regions of the regions 210.

As described herein, the mask 202 may be generated based at least on the values computed from the ray-traced samples. When mask values of the mask 202 indicate whether locations in the virtual environment 300 and/or pixels correspond to a penumbra, the mask 202 may be referred to as a penumbra mask. While the values (e.g., returned by a wave intrinsic function) may be used as mask values of the mask 202, in at least one embodiment, a thread uses a value to compute a mask value and stores the mask value in the mask 202. As an example, the mask values of the mask 202 may be binary values and each binary value may indicate whether a region 212 correspond to a penumbra. In at least one embodiment, a value of 1 may indicate a region 212 corresponds to a penumbra and a value of 0 may indicate a region 212 is outside of or does not correspond to a penumbra (is indicated as fully lit or fully shaded). Therefore, using the example above, when the value computed from the ray-traced samples is 0 or 32, the thread may compute and store a mask value of 1. When the value computed from the ray-traced samples is greater than 0 and less than 32, the thread may compute and store a mask value of 0. Thus, the regions 212D and 212N have a mask value of 0 and the other regions 212 have a value of 1. While 0 and 32 are used as examples of threshold values, different threshold values may be used to determine a mask value and/or only one or the other of the threshold values may be employed.

While the value(s) computed by a thread from ray-traced samples of at least one other thread is a sum in the present example, other types of statistical values may be computed. For example, in at least one embodiment, a computed value is a variance in the values of the group of threads. Further, more than one statistical value may be computed and may be used to determine a mask value, or may be used for another purpose. For example, the sum may be used by the image filterer 104 to determine whether to skip applying a denoising filter to a pixel and the variance may be used to determine a radius of a denoising filter applied to a pixel and/or a range of values to include in denoising performed by the denoising filter. Statistical information regarding ray-traced samples may be useful for denoising any of a variety of different types of ray-traced samples and disclosed embodiments are not limited to shadow or visibility related samples. For example, as described herein, the ray-traced samples may be of any condition of the virtual environment, light condition or otherwise (e.g., hit distances, depths, etc.).

As described herein, the image filterer 104 may use the mask data 124 or data otherwise corresponding to values generated by the threads from values of ray-traced samples (e.g., not necessarily a mask), as inputs to inform the denoising. The image filterer 104 may filter data using any of a variety of possible filtering techniques. In some examples, the image filterer 104 performs filtering using a cross (or joint) bilateral filter. The cross bilateral filter may replace each pixel by a weighted average of nearby pixels, using Gaussian-distributed weights that account for distance, variance, and/or other differences between pixels to guide images. In at least one embodiment, this may involve the mask data 124 or data otherwise corresponding to values generated by the threads from values of ray-traced samples being analyzed by the image filterer 104 to determine the filter weights. Edge-stopping functions may be used to identify common surfaces using G-buffer attributes to improve the cross bilateral filter's robustness under input noise.

In at least one embodiment, the image filterer 104 uses the mask data 124 to early out or skip applying a denoising filter to a pixel based on a mask value associated with the pixel. For example, the image filterer 104 may skip applying a denoising filter for a pixel based at least on the mask value indicating the pixel does not correspond to a penumbra. In at least one embodiment, the image filterer 104 maps the value(s) for each region 212 in the mask data to each pixel that corresponds to the region 210 (or more generally group of threads), When evaluating the pixel for denoising. For example, the value of 0 from the region 212A of the mask 202 may be used for each pixel corresponding to the region 210A in the render 200. Based on the image filterer 104 determining a pixel is mapped to or otherwise associated with a value of 1, the image filterer may apply a denoising filter to the pixel, or otherwise the pixel may be skipped.

As described herein, one or more parameters of a filter(s) and/or filter passes applied by the image filterer 104 may be determined based at least on the mask value(s) and/or statistical value(s) computed by a thread. In at least one embodiment, the filtering for a pixel(s) may be guided based at least in part on the value (e.g., variance) computed by the thread for the pixel(s). For example, the one or more parameters define a range of filter values, filter weights of pixels, and/or filter radiuses for the filter(s) and/or filter passes. The image filterer 104 may filter the spatial and/or temporal samples of render data using the one or more parameters. In various examples, a range of filter values may define a set of filter values for a pixel(s) and may be based on the variance of the pixel(s). For example, in applying a filter and/or filter pass to a pixel, the image filterer 104 may exclude the set of the filter values from the filtering based at least on the set being outside of the range. In embodiments, the range and/or filter radius may increase and decrease with the variance.

Any of the various filters and/or filter passes described herein may be applied using a filter kernel. The filters may also have one or more filter directions. The filter kernel of a filter may refer to a matrix (e.g., rectangular array) that defines one or more convolutions for processing image data (and/or lighting condition data or render data) for an image (e.g., data values of pixels) to alter one or more characteristics of the image, such as shades and/or colors of the pixels for the image. In some examples, a filter kernel may be applied as a separable filter. In applying a filter as a separable filter, the matrix may be represented using multiple sub-matrices, or filters, that may be separately applied to image data in multiple passes. When determining or computing a filter kernel for a separable filter, the disclosure contemplates that the sub-matrices may be directly computed, or may be derived from another matrix.

Each element of a matrix of a filter kernel may correspond to a respective pixel position. One of the pixel positions of a matrix may represent an initial pixel position that corresponds to a pixel to which the filter is applied and may be located at the center of the matrix (e.g., used to determine the location of the filter). For example, when applying a filter to a pixel corresponding to the location 332 of FIG. 3, the pixel may define the initial pixel position. In applying some filters, data values (e.g., visibility values) for other pixels may be used at image locations that are determined relative to the pixel to determine a data value(s) for the pixels within the footprint of the filter kernel. A filter direction may define the alignment of the matrix relative to the image and/or pixel to which the filter is applied along a filter width. Thus, when applying a filter to a pixel, other pixels for other pixel positions of a matrix of a filter kernel may be determined relative to the initial pixel position using the filter direction(s) and the filter kernel.

Each element of a matrix of a filter kernel may comprise a filter weight for the pixel position. The matrix may be applied to an image using convolution, in which a data value for each pixel of the image that corresponds to a pixel position of the matrix may be added or otherwise combined with data values for pixels that correspond to the local neighbors in the matrix, as weighted by the filter values (also referred to as filter weights). For one or more of the filters described herein, the filter values may be configured to blur the pixels, such as by fitting a distribution(s) to the filter kernel (e.g., to a width and a height).

The data values to which the filter(s) are applied may correspond to lighting condition data (e.g., visibility data) for the pixels. Thus, applying a matrix of a filter kernel to a pixel may cause the lighting condition data to be at least partially shared amongst the pixels that correspond to the pixel positions of the filter kernel. The sharing of the lighting condition data may mitigate noise due to sparsely sampling lighting conditions in ray tracing. In at least one embodiment, the image filterer 104 performs spatial filtering of the render data. In some cases, the image filterer 104 may also perform temporal filtering. Temporal filtering may leverage ray-traced samples that may be generated similarly to those described with respect to FIG. 3, but for previous states of the virtual environment 300 and/or previous output frames. Thus, the temporal filtering may increase the effective sample count of ray-traced samples used to determine the filtered lighting condition data for a pixel and/or may increase the temporal stability of the filtered lighting condition data for the pixel.

As temporal ray-traced samples may correspond to different states of the virtual environment 300, certain samples may not be relevant or as relevant to the present state of the virtual environment 300 (e.g., objects or the camera may move, light sources may change), presenting the risk of visual artifacts when they are used for filtering. Some embodiments may use variance in values (e.g., computed by the threads of the schedulable units according to FIG. 2) that correspond to temporal ray-traced samples to guide temporal filtering, so as to reduce or eliminate these potential artifacts. In accordance with further aspects of the present disclosure, spatial filtering may be skipped for a pixel for a frame based at least in part on determining that the mean, first moment of variance, and/or variance computed by the threads of the schedulable units from temporally ray-traced samples associated with the pixel is greater than or equal to a first threshold, and/or less than or equal to a second threshold, and that a count of the values exceeds a third threshold.

Present approaches may be used for any suitable ray tracing effect or technique, such as for global illumination, ambient occlusion, shadows, reflections, refractions, scattering phenomenon, and dispersion phenomenon. Thus, for example, while in some examples, the ray-traced samples may correspond to visibility samples, in other examples, the ray-traced samples may correspond to color luminance. Further, present approaches may be implemented in a different rendering pipeline than what is shown in FIG. 1, which may or may not use the image combiner 106 to combine output from the 3D renderer 108.

Figure 4:
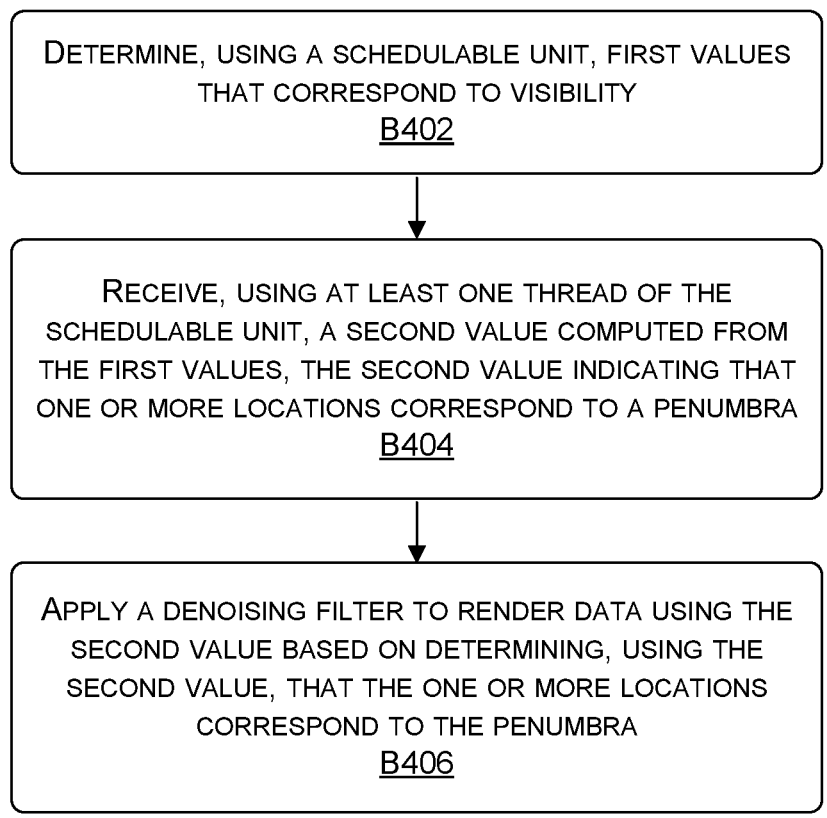
FIG. 4 is a flow diagram showing an example of a method for using a schedulable unit to determine visibility values and a value that indicates a location in a scene corresponds to a penumbra, in accordance with some embodiments of the present disclosure.
Figure 5:
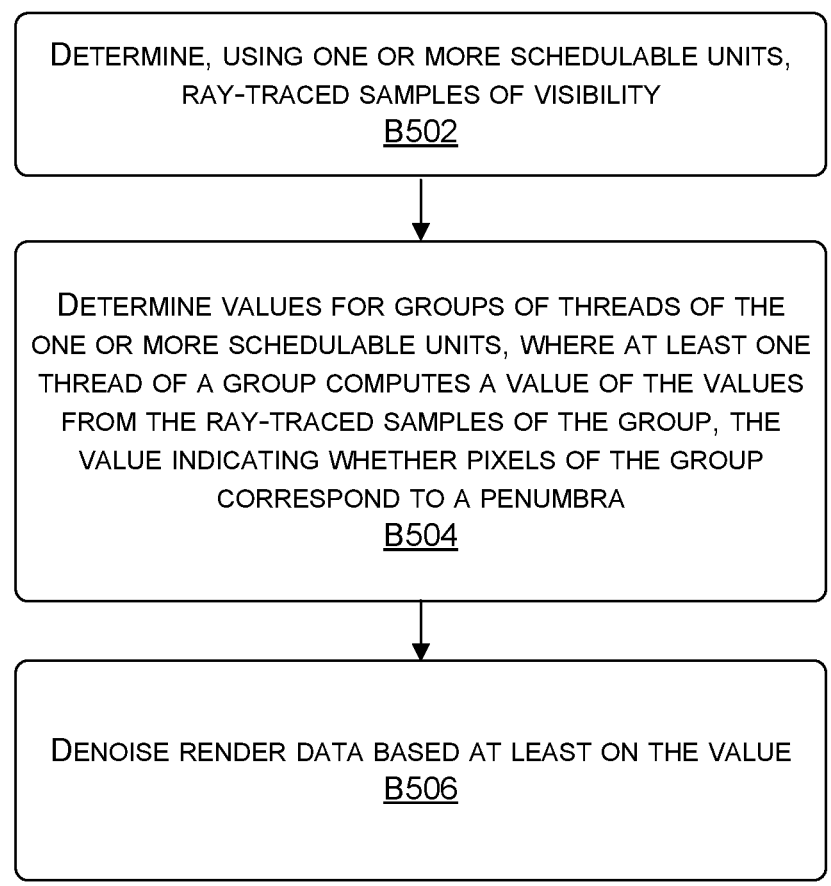
FIG. 5 is a flow diagram showing an example of a method for using groups of threads of one or more schedulable units to determine ray-traced samples of visibility and values that indicate whether pixels correspond to penumbras, in accordance with some embodiments of the present disclosure.
Figure 6:
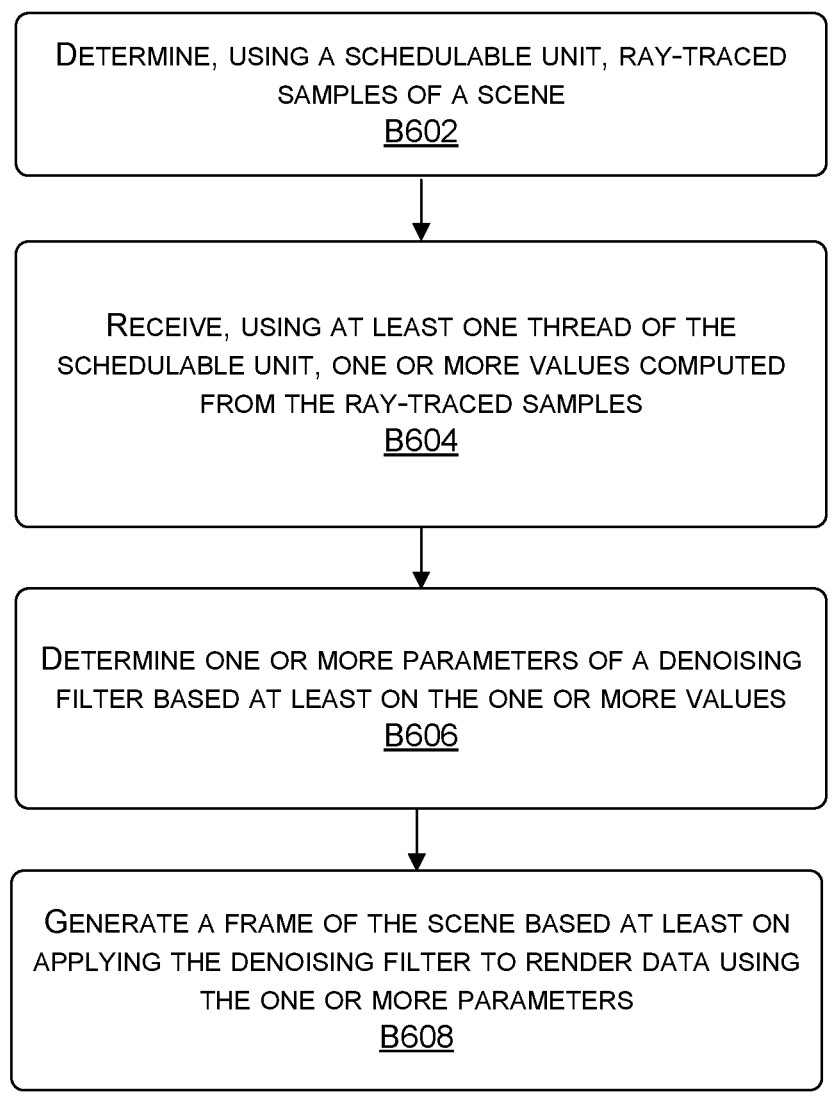
FIG. 6 is a flow diagram showing an example of a method for using a schedulable unit to determine ray-traced samples and one or more values used to determine one or more parameters of a denoising filter, in accordance with some embodiments of the present disclosure.

Now referring to FIGS. 4-6, each block of methods 400, 500, and 600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the image rendering system 100 (FIG. 1). However, these methods may additionally or alternatively be executed by any one system, or any combination of systems, including, but not limited to, those described herein.

FIG. 4 is a flow diagram showing an example of a method 400 for using a schedulable unit to determine visibility values and a value that indicates a location in a scene corresponds to a penumbra, in accordance with some embodiments of the present disclosure. The method 400, at block B402, includes determining, using a schedulable unit, first values that correspond to visibility. For example, the ray tracer 102 may determine, using threads of a schedulable unit that corresponds to the region 210D, first values that correspond to visibility of the virtual environment 300 with respect to at least the light source 320 based at least on casting rays in the virtual environment 300, such as the rays 340, 342, and 344. The render data 122 of FIG. 1 may represent the first values or the first values may otherwise be used to derive the render data 122.

The method 400, at block B404, includes receiving, using at least one thread of the schedulable unit, a second value computed from the first values, the second value indicating that one or more locations correspond to a penumbra. For example, the ray tracer 102 may receive, using at least one thread of the schedulable unit, a second value computed from the first values. For example, the thread may execute a wave intrinsic function to receive a first value from registers associated with one or more other threads of the schedulable unit, and computes the second value from the first value(s). The second value may indicate that one or more locations in the virtual environment 300 correspond to a penumbra.

The method 400, at block B406, includes applying a denoising filter to the first values using the second value based on determining, using the second value, that the one or more locations correspond to the penumbra. For example, the mask data 124 of FIG. 1 may represent the second value or the second values may otherwise be used to derive the mask data 124. For example, the thread may determine a mask value (e.g., a binary value) from the second value and store the mask value as the mask data 124.

The method 400, at block B408, includes applying a denoising filter to render data that corresponds to the first values based at least on determining, using the second value, that the one or more locations correspond to the penumbra. For example, the image filterer 104 may apply a denoising filter to the render data 122 based at least on determining, using the second value, that the one or more locations correspond to the penumbra. While the method 400 is described with respect to a schedulable unit, the method 400 may be performed using any number of schedulable units operating in parallel. Additionally, in some embodiments, all threads of a schedulable unit may be employed in the method 400 or a group or subset of the threads. Further, the first values need not be received from all threads or group of threads of the schedulable unit.

FIG. 5 is a flow diagram showing an example of a method 500 for using groups of threads of one or more schedulable units to determine ray-traced samples of visibility and values that indicate whether pixels correspond to penumbras, in accordance with some embodiments of the present disclosure. The method 500, at block B502, includes determining, using one or more schedulable units, ray-traced samples of visibly. For example, the ray tracer 102 may determine, using groups of threads of one or more schedulable units of one or more parallel processors, ray-traced samples of visibility of pixels assigned to the group with respect to at least the light source 320 in the virtual environment 300. In at least one embodiment, a group of threads may refer to each thread of a schedulable unit or a subset of threads of a schedulable unit.

The method 500, at block B504, includes determining values for groups of threads of the one or more schedulable units, where at least one thread of a group computes a value of the values from the ray-traced samples of the group, the value indicating whether pixels of the group correspond to a penumbra. For example, the ray tracer 102 may determine values for the groups of threads, such as each schedulable unit corresponding to regions 210 and/or sub-regions thereof. For each group of the groups of threads, at least one thread of the group (e.g., each thread) may compute a value of the values from the ray-traced samples of the group. The value may indicate whether at least one pixel of the pixels (e.g., each pixel) assigned to the group corresponds to a penumbra.

The method 500, at block B506, includes denoising render data based at least on the value. For example, the image filterer 104 may denoise the render data 122 that corresponds to the ray-traced samples of the groups of threads based at least on the value of the group for a plurality of the groups of threads. As an example, each thread of a group may determine a mask value (e.g., a binary value) from the value and one or more of the threads of the group may store the mask value as the mask data 124. The image filterer 104 may use the mask data 124 to denoise the render data 122.

FIG. 6 is a flow diagram showing an example of a method 600 for using a schedulable unit to determine ray-traced samples and one or more values used to determine one or more parameters of a denoising filter, in accordance with some embodiments of the present disclosure. The method 600, at block B602, includes determining, using a schedulable unit, ray-traced samples of a scene. For example, the ray tracer 102 may determine, using threads of a schedulable unit of one or more parallel processors, ray-traced samples of the virtual environment 300.

The method, at block B604, includes receiving, using at least one thread of the schedulable unit, one or more values computed from the ray-traced samples. For example, the ray tracer 102 may receive, using at least one thread of the schedulable unit, one or more values computed from the ray-traced samples. For example, at least one thread may execute a wave intrinsic function to receive a value(s) of ray-traced samples from registers associated with one or more other threads of the schedulable unit, and may compute the one or more values from the ray-traced samples. In some embodiments, a value(s) may indicate that one or more locations in the virtual environment 300 correspond to a penumbra. However, in other examples a value(s) may indicate other information relevant to denoising.

The method 600, at block B606, includes determining one or more parameters of a denoising filter based at least on the one or more values. For example, the mask data 124 of FIG. 1 may represent the value(s) or the value(s) may otherwise be used to derive the mask data 124. For example, a thread may determine a mask value (e.g., a binary value) from the value(s) and store the mask value as the mask data 124. In other examples, the value(s) may be used as the mask value(s). The image filterer 104 may determine one or more parameters of a denoising filter based at least on the one or more values, for example, by leveraging the mask data 124.

The method 600, at block B608, includes generating a frame of the scene based at least on applying the denoising filter to render data that corresponds to the ray-traced samples using the one or more parameters. For example, the image rendering system 100 may generate an output image 120 based at least on applying the denoising filter to the render data 122 that corresponds to the ray-traced samples using the one or more parameters. While the render data 122 is provided as an example, the denoising filter may be used to denoise other render data, such as render data that corresponds to ray-traced samples other than visibility samples.

Example Computing Device

Figure 7:
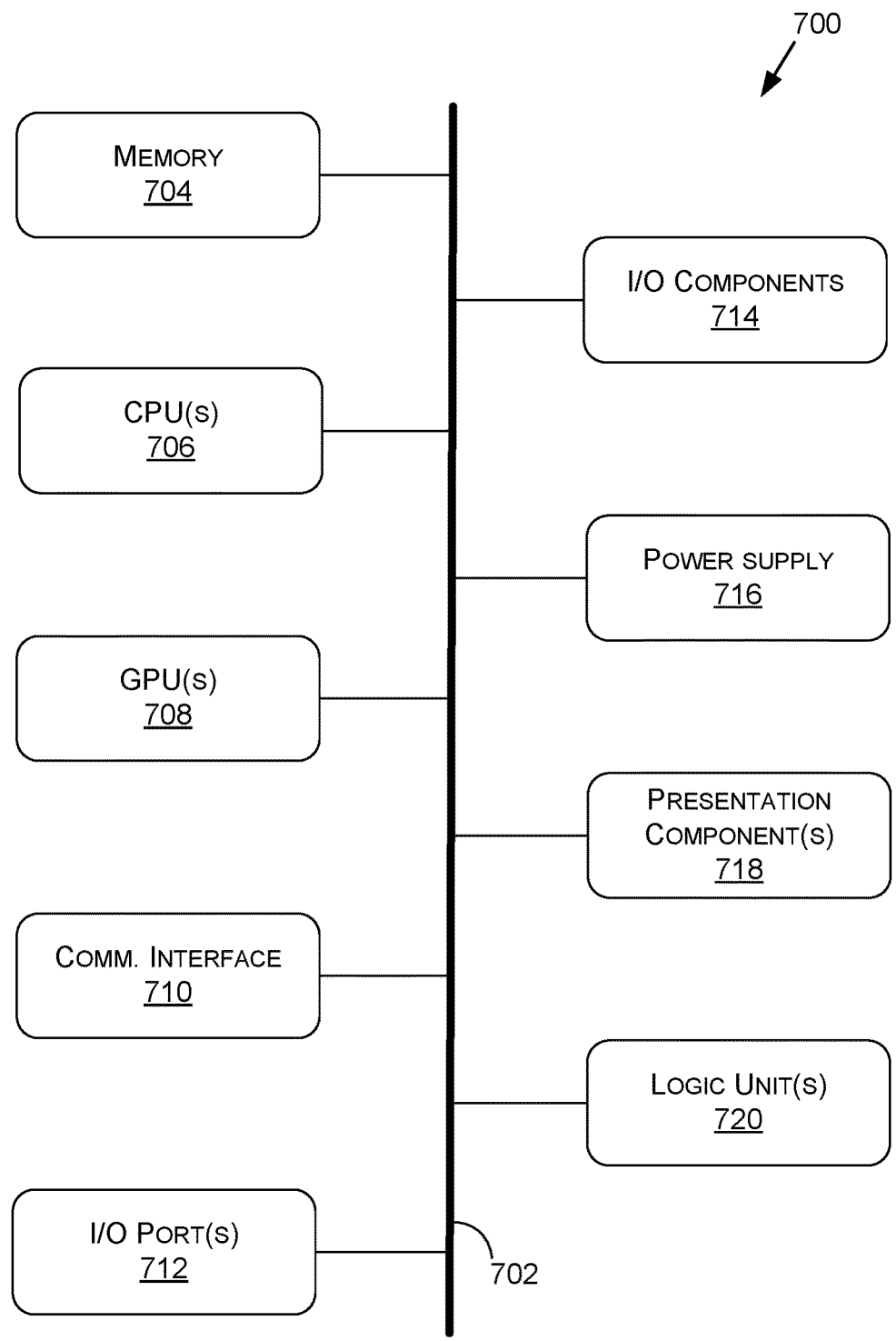
FIG. 7 is a block diagram of an example computing environment suitable for use in implementing some embodiments of the present disclosure.

FIG. 7 is a block diagram of an example computing device(s) 700 suitable for use in implementing some embodiments of the present disclosure. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers). For example, depending on the type of computing device 700, the processor may be an Advanced RISC Machines (ARM) processor implemented using Reduced Instruction Set Computing (RISC) or an x86 processor implemented using Complex Instruction Set Computing (CISC). The computing device 700 may include one or more CPUs 706 in addition to one or more microprocessors or supplementary co-processors, such as math co-processors.

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 707 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously. The GPU(s) 708 may generate pixel data for output images in response to rendering commands (e.g., rendering commands from the CPU(s) 706 received via a host interface). The GPU(s) 708 may include graphics memory, such as display memory, for storing pixel data or any other suitable data, such as GPGPU data. The display memory may be included as part of the memory 704. The GPU(s) 708 may include two or more GPUs operating in parallel (e.g., via a link). The link may directly connect the GPUs (e.g., using NVLINK) or may connect the GPUs through a switch (e.g., using NVSwitch). When combined together, each GPU 708 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

Examples of the logic unit(s) 720 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, the communication interface 710 may also include one or more processing cores and/or components thereof, such as Data Processing Units (DPUs), to access and store data directly in the local memory of other processing units—such as GPUs—of the computing device 700.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 700 of FIG. 7—e.g., each device may include similar components, features, and/or functionality of the computing device(s) 700.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 700 described herein with respect to FIG. 7. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Example Data Center

FIG. 8 illustrates an example data center 800, in which at least one embodiment may be used. In at least one embodiment, data center 800 includes a data center infrastructure layer 810, a framework layer 820, a software layer 830 and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 822 may configure or otherwise control one or more node C.R.s 816(1)-816(N) and/or grouped computing resources 814. In at least one embodiment, resource orchestrator 822 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 844, a configuration manager 834, a resource manager 836 and a distributed file system 838. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may utilize distributed file system 838 for large-scale data processing (e.g., "big data"). In at least one embodiment, job scheduler 844 may include a Spark driver to facilitate scheduling of workloads supported by various layers of data center 800. In at least one embodiment, configuration manager 834 may be capable of configuring different layers such as software layer 830 and framework layer 820 including Spark and distributed file system 838 for supporting large-scale data processing. In at least one embodiment, resource manager 836 may be capable of managing clustered or grouped computing resources mapped to or allocated for support of distributed file system 838 and job scheduler 844. In at least one embodiment, clustered or grouped computing resources may include grouped computing resource 814 at data center infrastructure layer 810. In at least one embodiment, resource manager 836 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 838 of framework layer 820. One or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 838 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 834, resource manager 836, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:
    determining one or more first values that correspond to one or more rays cast from at least two locations in a scene, the at least two locations corresponding to at least two pixels of an image depicting the scene;
    computing a second value that indicates one or more illumination properties of a region corresponding to the at least two locations using a wave intrinsic function that accesses the one or more first values from one or more registers corresponding to one or more threads of one or more parallel processors to produce the second value; and
    applying a denoising filter to render data based at least on determining, using the second value, that the at least two pixels correspond to the one or more illumination properties.

2. The method of claim 1, wherein the wave intrinsic function is called by at least one thread of the one or more threads.

3. The method of claim 1, wherein the computing the second value includes computing a statistic corresponding to the at least two locations using the one or more first values.

4. The method of claim 1, wherein the computing the second value is performed in a same ray tracing pass as the determining the one or more first values, and the applying the denoising filter is performed in a denoising pass.

5. The method of claim 1, wherein the determining the one or more first values and the computing the second value are performed by a ray generation shader executed using the one or more parallel processors.

6. The method of claim 1, wherein the computing the second value uses the one or more first values based at least on the one or more first values corresponding to a same schedulable unit of the one or more parallel processors.

7. The method of claim 1, wherein the one or more first values include a plurality of values determined using a plurality of threads of the one or more parallel processors, and at least one thread of the plurality of threads computes the second value using the plurality of values.

8. The method of claim 1, wherein the computing the second value includes retrieving, using a thread of the one or more threads, first data indicating the one or more first values from one or more registers corresponding to the one or more threads, and the method further includes the thread storing second data indicating the second value in a frame buffer, wherein the applying the denoising filter includes accessing the second data from the frame buffer.

9. The method of claim 1, wherein the second value corresponds to a lower resolution version of the region.

10. A system comprising:
    one or more processing units to perform operations including:
        computing one or more first values that correspond to one or more rays cast from at least two locations in a scene, the at least two locations corresponding to at least two pixels of an image depicting the scene;
        determining a second value that indicates one or more illumination properties of a region corresponding to the at least two locations using a wave intrinsic function that accesses the one or more first values from one or more registers corresponding to one or more threads of one or more parallel processors to produce the second value; and
        filtering render data based at least on determining, using the second value, that the at least two pixels correspond to the one or more illumination properties.

11. The system of claim 10, wherein the wave intrinsic function is called by at least one thread of the one or more threads.

12. The system of claim 10, wherein the second value corresponds to a statistic on the at least two locations, the statistic computed using the one or more first values.

13. The system of claim 10, wherein the determining the second value is performed in a same ray tracing pass as the computing the one or more first values, and the filtering is performed in a denoising pass.

14. The system of claim 10, wherein the computing the one or more first values and the determining the second value are performed by a ray generation shader executed using the one or more parallel processors.

15. The system of claim 10, wherein the system is comprised in at least one of:
    a system for performing simulation operations;
    a system for performing simulation operations to test or validate autonomous machine applications;
    a system for performing deep learning operations;
    a system implemented using an edge device;
    a system incorporating one or more Virtual Machines (VMs);
    a system implemented at least partially in a data center; or
    a system implemented at least partially using cloud computing resources.

16. At least one processor comprising:
    one or more circuits to filter render data based at least on determining, using a second value, that at least two pixels of an image depicting a scene correspond to one or more illumination properties, the second value being computed using a wave intrinsic function that accesses one or more first values from one or more registers corresponding to one or more threads of one or more parallel processors to produce the second value,
    wherein the second value indicates the one or more illumination properties of a region corresponding to at least two locations in the scene, and
    the one or more first values correspond to one or more rays cast from the at least two locations, the at least two locations corresponding to the at least two pixels.

17. The at least one processor of claim 16, wherein the wave intrinsic function is called by at least one thread of the one or more threads.

18. The at least one processor of claim 16, wherein the second value is computed using a statistic corresponding to the at least two locations and the one or more first values.

19. The at least one processor of claim 16, wherein the second value is computed in a same ray tracing pass as the one or more first values are determined, and the render data is filtered in a denoising pass.

20. The at least one processor of claim 16, wherein the processor is comprised in at least one of:
    a system for performing simulation operations;
    a system for performing simulation operations to test or validate autonomous machine applications;
    a system for performing deep learning operations;
    a system implemented using an edge device;

a system incorporating one or more Virtual Machines (VMs);
a system implemented at least partially in a data center; or
a system implemented at least partially using cloud computing resources.

\* \* \* \* \*